8190X
R. Daniel,
Making Wrought Nails,
Patented May 13, 1834
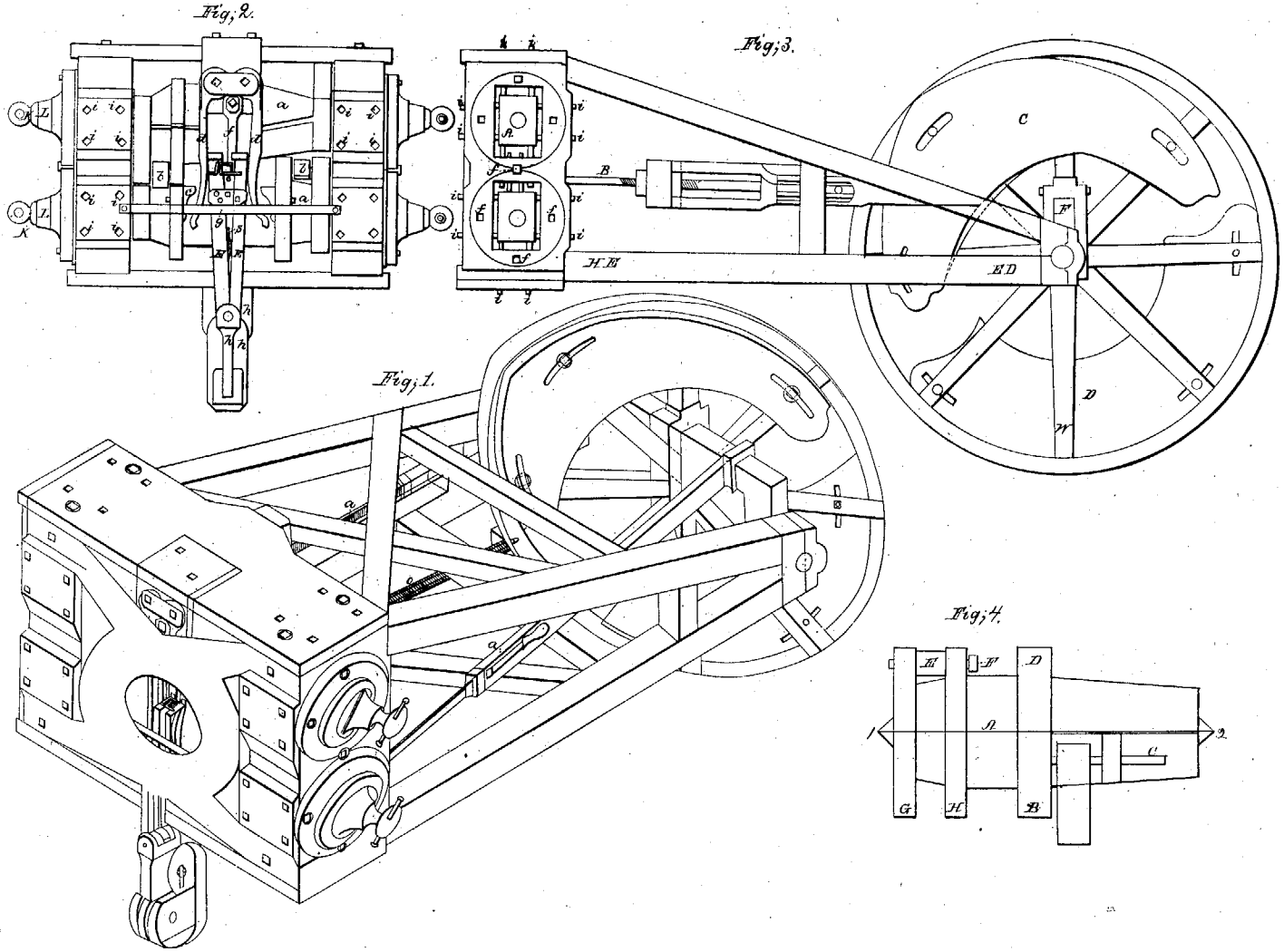
N. PETERS, PHOTO-LITHOGRAPHER, WASHINGTON, D. C.

Reuben Daniels
Letters Patent

The Schedule referred to in these Letters Patent and making part of the same containing a description in the words of the said Reuben Daniels himself of his improvement in making wrought nails by machinery at one operation.

To all to whom these presents shall come.

Be it known that I Reuben Daniels of Woodstock in the County of Windsor and State of Vermont have invented a new and useful improvement in making wrought nails by machinery at one operation & that the following is a full & exact description of the construction and operation of the said machine as invented or improved by me ——

This improvement in the making or manufacturing of wrought nails is shown by the drawings here referred to & the following specifications. No 1 of the drawings here referred to represents a transverse view of the machine prepared to receive a belt on the balance wheel to put it in motion. The construction & proportions of the frame may be considerably varied provided great strength be combined with the proper construction. The whole machine is constructed of iron & steel. No 2 represents an end view of the machine. No 3 shows a side view & at the left end are seen the boxes placed in mortices so as to move to the right or left & up & down by means of screws. O. O. in the centre of the boxes represent the place for the centres on which the [illegible] [illegible] are hung. W shows the balance wheel made so far eccentric as to balance the eccentric motion of the crank. Thus constituted a belt will run on the periphery of the balance wheel, which in this machine does the office of a driving pulley. The above drawings are calculated on a scale of two ninths of a foot to the foot. The invention Drawing invention claimed in this machine consists in the combination of various mechanical powers to produce the desired result as follows. 1st the apparatus and principle for cutting off the nail rod as it comes hot from the fire 2nd the application of Stephen S. Goulds patent dies for making wrought nails as applied to reciprocating instead of rotary motion 3d the heading apparatus as effected by means of a cam attached to the driving or balance pulley — 4th the method of constructing & hanging the cylinders to which the dies are attached. 5th the method of altering the length of the pitmans. And 1st in figure 2 at the letter I is shown a small aperture into which the nail rod is to be introduced hot of a sufficient length to make one nail by an apparatus described as follows. Appended to the bottom part of the front part of the frame are two stands to receive the bottom part of the jaws to which the chisels are attached for the purpose of cutting off the rods. These stands are constructed with slots or mortises so that the jaws can be raised or lowered so far as to bring the cutting chisels right against the opening designed to receive the rods. These stands are shown in the drawing Fig 2. lettered h. h. h. The hinge of the jaws is shown on the stands & marked O. The jaws holding the cutting chisels are shown on said drawing, & are marked E. E. between which letters is seen the spring A. designed to throw the jaws open after the rod is cut off. The cams c. c. are attached to the lower cylinder and the reciprocating motion produced by the rotation of the cranks brings the cams in contact with the levers d. d. against the jaws E. E. which process cuts off the rod and the jaws are immediately opened by the spring A. g. as shown in figure 2 is a spring placed across the front of the frame with a bend inwards at the jaws to keep them in their proper place 2nd The application plication of Stephen I Gould's patent dies. The dies are made of Steel & are such a part of the segment of a cylinder that the reciprocating motion of the cylinders shall cause them to come in contact with each other with the exception of a space exactly of the size and shape of the nail to be formed. Each cylinder has one die adapted to make two sides of the nail. The dies are attached to a flanch on each cylinder adapted to receive them & made firm in their place by a screw bolt & steady pins. The motion of the cylinders is produced by the crank communicated to the cylinders by the pitman attached to the cylinders by means of two flanches projecting from the main body of each cylinder between which flanches one end of the pitman is attached by a round pin forming a joint between the flanches. The end of the pitmans are seen in Fig 2. & marked b.b. & in fig 3 the pitman is marked B. 3^d that part of the dies opposite the cutting chissels first grips the rod at a point so far from the end as to leave metal sufficient to form the head of the nail. at this instant a cam marked C. in fig. 3. on the balance wheel drives a horizontal bar marked O. figure 1. against the heading tool which is attached to the upper cylinder & the head is formed the next instant after the rod is cut off. The horizontal bar passes thro' two stays one near the cylinders & the other near the balance wheel. That part of the bar passing thro' the stay on one side near the wheel is square the other portion round & is encircled by a spiral spring extending from the square part of the bar to the stay near the cylinders the design of which is to throw the bar back after the nail is headed. After the nail is headed the cylinders continue their motion so far as to pass the the whole length of the nail thro' the dies. the motion
is then reciprocated & the process renewed by cutting off
another nail ---- 4th The cylinders are of an irregular shape
designed to combine as much strength and lightness as consistant
with securing the object designed to be accomplished. In the
machine here described the cylinders are seventeen & a half
inches long & in the greatest diameter with the exception of the
flanches of about seven inches & tapering the ends where the
diameters are about five inches. The cylinders are hung
on steel centres. These centres each pass thro' a piece of cast
iron four inches square & these pieces are placed in four mor-
tises five inches square in the frame of the Machine, correspond-
ing to the four ends of the cylinders in such a manner that
each square piece containing a centre can be set or moved
to the right hand or to the left & up or down so as to ad-
just all the centres & with them the cylinders to their proper
place. Into these square boxes are introduced large screws
passing thro' strong collars for the purpose of moving them
horizontally. The screws used for setting the boxes or adjust-
ing them are marked on figure 2. by the letter i & those
for moving the cylinders horizontally are marked k. The
collars thro' which these last screws pass are marked L.
5th the pitmans are so constructed that their length may be
varied so as to adjust them to their designed purpose. They
are attached to a crank carried by the balance wheel
or driving pulley at one end, & at the other end one pitman
is attached to one cylinder & the other to the other cylin-
der & are so adjusted that one revolution of the crank will
turn the cylinders about one third round. The pitman
is made of two pieces & united by a strong screw & two
nuts passing thro' a collar as shewn in figure 3 and
marked B. Figure 4 represents a horizontal section of
the cylinder to which the heading tool is attached & is drawn
on

516 on a scale of one third of a foot to the foot. B. represents the hammer or heading tool to be driven by the horizontal bar to form the head of the nail. This hammer or heading tool turns on a pin or pivot marked C running parallel with the longitudinal centre of the cylinder. After the head is formed a spring throws the hammer back. D represents a flanch to which is attached one of the dies opposite the hammer B. — E. represents the end of the pitman which gives motion to the cylinder. F represents the pin or pivot on which the pitman between the two flanches G.H. giving motion to the cylinder 1.2. represents the centres on which the cylinder turns. Woodstock April 8th 1834.

Witnesses
Eli Dunham
David Peirce

Reuben Daniels

Exd
[illegible]

1573 [illegible]